United States Patent [19]

Kurz et al.

[11] Patent Number: 4,538,553
[45] Date of Patent: Sep. 3, 1985

[54] MODE OF CONTROL OF THE HEATING CAPACITY OF A HYDRODYNAMIC BRAKE

[75] Inventors: Wolf-Dieter Kurz; Hans Hanke, both of Stuttgart; Andreas Braatz, Rutesheim, all of Fed. Rep. of Germany

[73] Assignee: Daimler-Benz Aktiengesellschaft, Fed. Rep. of Germany

[21] Appl. No.: 569,853

[22] Filed: Jan. 11, 1984

[30] Foreign Application Priority Data

Jan. 19, 1983 [DE] Fed. Rep. of Germany ....... 3301560

[51] Int. Cl.$^3$ .............................................. F01P 3/12
[52] U.S. Cl. .............................. 123/41.13; 123/41.31; 188/274
[58] Field of Search ............... 123/41.02, 41.08, 41.09, 123/41.1, 41.13, 41.31; 188/266, 274

[56] References Cited

U.S. PATENT DOCUMENTS

| | | | |
|---|---|---|---|
| 2,541,227 | 2/1951 | Findley | 123/41.31 |
| 3,024,876 | 3/1962 | Montgomery | 188/274 |
| 3,720,372 | 3/1973 | Jacobs | 237/12.3 |
| 4,430,966 | 2/1984 | Marandet et al. | 123/41.31 |

Primary Examiner—William A. Cuchlinski, Jr.
Attorney, Agent, or Firm—Craig & Burns

[57] ABSTRACT

Method of and apparatus for control of the heating capacity of a hydrodynamic brake which is associated with a liquid-cooled internal combustion engine, in the cooling medium circuit of which heat exchangers, a cooling medium circulating pump and the hydrodynamic brake acting as a heater are arranged. A regulation of the state of charge of the working chamber of the hydrodynamic brake occurs by a pressure regulator valve.

In the case of a method and apparatus for controlling the heating capacity taking an available drive power into consideration, the pressure regulator valve which influences the heating capacity is controllable as a function of the load of the internal combustion engine.

22 Claims, 5 Drawing Figures

MODE OF CONTROL OF THE HEATING CAPACITY OF A HYDRODYNAMIC BRAKE

The invention relates to method of and apparatus for control of the heating capacity of a hydrodynamic brake which is associated with a liquid-cooled internal combustion engine, for example in a motor vehicle, in the cooling medium circuit of which heat exchangers, a cooling medium circulating pump and the hydrodynamic brake acting as a heater are arranged, which includes a pressure regulator valve to regulate the state of charge of its working chamber.

A heater in the cooling water circuit of an internal cumbustion engine having a heat exchanger for the vehicle heating is known from the U.S. Pat. No. 3,720,372, in which a hydrodynamic brake which is drivably connected to the internal combustion engine is provided a heater. A temperature-dependent and pressure-dependent regulator valve is provided at the outlet of the hydrodynamic brake to influence the state of charge. However, there is an attendant disadvantage in this case in that the load state of the internal combustion engine is not taken into consideration with regard to the control of the heating capacity of the dynamic brake. The mode of control of the heating capacity of a hydrodynamic brake, according to the invention, exhibits the advantage that the instantaneous load of the internal combustion engine is decisive as a measure of the heating capacity of the hydrodynamic brake. During idling and during overrunning, the hydrodynamic brake delivers the maximum heating capacity, and with increasing load of the internal combustion engine the heating capacity of the hydrodynamic brake is reduced so that the driving power of a motor vehicle is only trivially impaired.

Accordingly, it is an object of the invention to provide method and apparatus where a hydrodynamic brake is used as a heater in the cooling medium circuit of an internal combustion engine, to control the heating capacity of the hydrodynamic brake in accordance with available drive power.

It is another object of the invention to provide a method of controlling the heating capacity of a hydrodynamic brake for a liquid cooled internal combustion engine, the engine having a cooling circuit comprising at least one heat exchanger, a cooling medium circulating pump, the hydrodynamic brake serving as a heat exchanger and a pressure regulator valve means for regulating the state of charge of the hydrodynamic brake, the steps comprising circulating the cooling medium through the cooling circuit and controlling the heating capacity of the hydrodynamic brake as a function of the load of the internal combustion engine by actuating at least the pressure regulator valve means.

It is another object of the invention to provide apparatus for controlling the heating capacity of a hydrodynamic brake serving as a portion of a cooling circuit of an internal combustion engine wherein means is provided for controlling the heating capacity of the hydrodynamic brake as a function of the load of the internal combustion engine by actuating at least the pressure regulator valve means in the cooling circuit of the internal combustion engine.

It is another object of the invention to provide apparatus for controlling the heating capacity of a hydrodynamic brake for a liquid-cooled internal combustion engine, the engine having a cooling circuit comprising at least one heating exchanger, a cooling medium circulating pump, the hydrodynamic brake serving as a heat exchanger and a pressure regulator valve means for regulating the state of charge of the hydrodynamic brake, the latter valve means comprising a valve seat and a load control piston having a sharp conical valve plate for engaging the valve seat, a first bore in the region of the valve plate bridging the valve seat, means for conjointly loading the control piston with a spring force in addition to a reference pressure, the axes of the inlet orifice and outlet orifice of the pressure regulator valve being arranged axially parallel, a second bore closable by the control piston and connecting together the inlet orifice and the outlet orifice with a third bore connecting together the inlet orifice and the outlet orifice provided which is closable by a pressure release valve.

A further object of the invention is to provide an improved apparatus and method of controlling the heating capacity of a hydrodynamic brake for liquid-cooled internal combustion engines which avoids the difficulties which exist in the prior art.

It is another object of the invention to provide an apparatus and method for controlling the heating capacity of a hydrodynamic brake which is economical of manufacture and operation.

These and other objects, features, and advantages of the present invention will become more apparent from the following description when taken in connection with the accompanying drawings which show, for the purposes of illustration only, plural embodiments in accordance with the present invention, and wherein.

Figure 1:
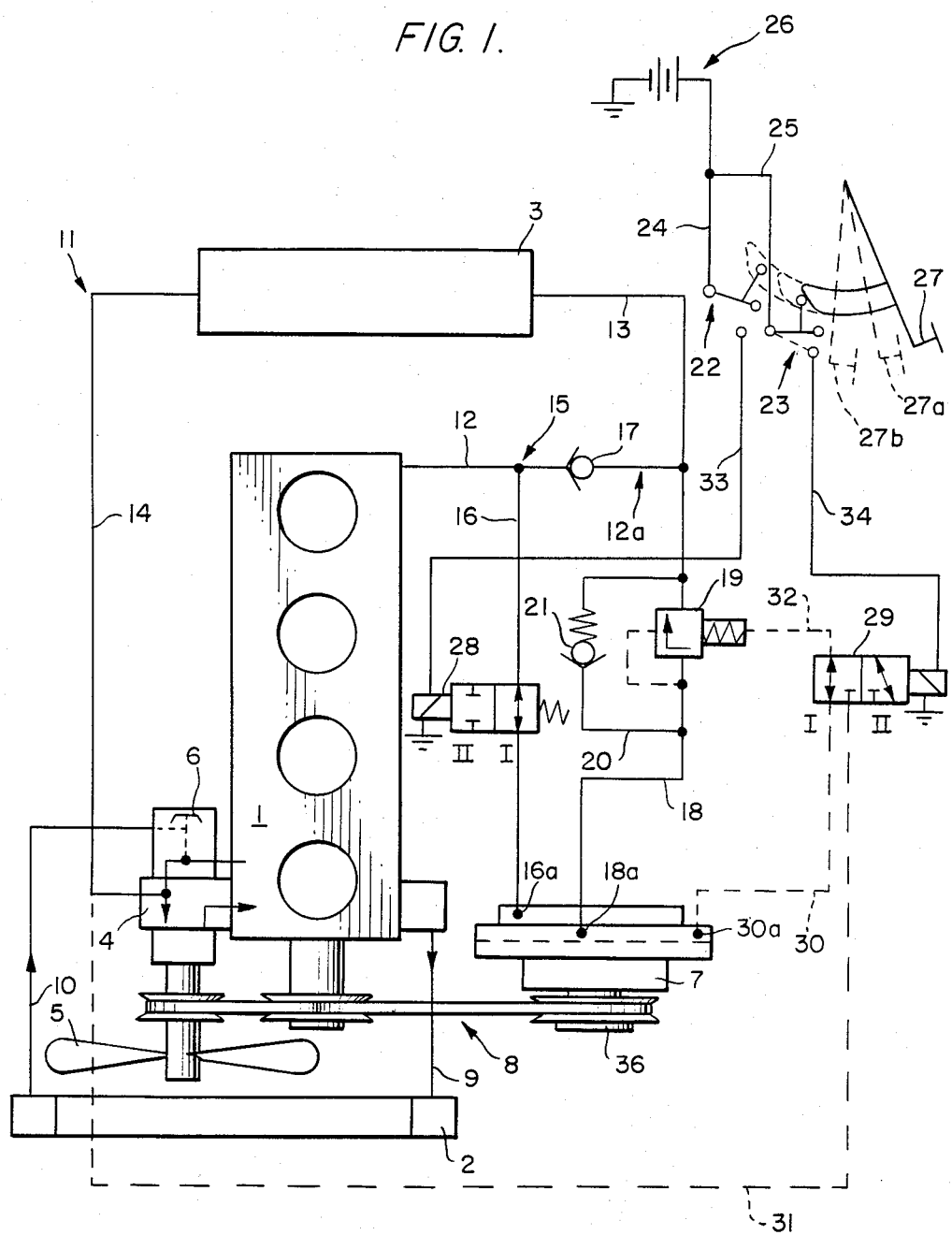
FIG. 1 shows a diagrammatically illustrated cooling medium circuit of an internal combustion engine with three-stage mode of control of the heating capacity of a hydrodynamic brake.

Referring now to the drawings wherein like reference numerals represent like elements, an internal combustion engine designated 1 in FIG. 1 has associated with it heat exchangers 2 and 3, a cooling medium circulating pump 4, a fan impeller 5, a thermostat valve 6 and a hydrodynamic brake 7. A small cooling medium circuit 8 of the internal combustion engine 1 comprises pipes 9 and 10, and a large cooling medium circuit 11 of the internal combustion engine 1 comprises pipes 12, 13 and 14. A branch 15 is provided in the pipe 12 with a pipe 16 which ends at a connecting spigot 16a of the hydrodynamic brake 7. A 2/2-way valve 28 arranged in the pipe 16 is electrically operable. The pipe section 12a of the pipe 12 includes a nonreturn valve 17. A pipe 18, in which a pressure regulator valve 19 with integrated pressure relief valve is arranged, leads from the hydrodynamic brake 7 via 18a to the pipe 12 via the pipe section 12a. A bypass pipe 20, which includes a nonreturn valve with spring 21, is associated with the pressure regulator valve 19. Electrical switches 22, 23 are connected by electrical conductors 24, 25 to a battery 26. The electrical switches 22, 23 are operable by an accelerator pedal 27. An electrically operable 3/2-way valve 29 includes on the connection side reference-pressure pipes 30, 31 and a control pipe 32. The control pipe 32 connects the 3/2-way valve 29 to the pressure regulator valve 19. The pressure existing in the ring duct of the hydrodynamic brake 7 is available by way of the reference-pressure pipe 30 via 30a, and the pressure on the suction side of the cooling medium circulating pump 4 is available by way of the reference-pressure pipe 31. An electrical conductor 33 leads from the switch 22 to the electric drive of the 2/2-way valve 28, and an electrical conductor 34 leads from switch 23 to the electric drive of the 3/2-way valve 29.

The hydrodynamic brake 7, which comprises a solenoid coupling, the fan impeller 5 and the cooling medium circulating pump are drivably connected to the internal combustion engine.

When the internal combustion engine 1 is idling or overrunning and an additional heating capacity is required, a driving connection is established between the internal combustion engine 1 and the hydrodynamic brake 7 by activating the solenoid coupling 36. The accelerator pedal 27 occupies the position shown in FIG. 1, and the electrical switches 22, 23 are opened. The reference pressure tapped from the ring duct of the hydrodynamic brake 7 is passed through 30a, the pipe 30, with 3/2-way valve 29 and the control pipe 32 to the pressure regulator valve 19 and, conjointly with the force of a spring 61 (FIG. 5), loads a control piston of a pressure regulator valve 19. The control piston closes the pipe 18 until the pressure of the coolant liquid in the working chamber of the hydrodynamic brake is greater than the control pressure formed by the reference pressure and by the spring 61. The heating capacity of the hydrodynamic brake 7 is a function of the pressure in the ring duct of the hydrodynamic brake (FIG. 3, graph I and FIG. 4, graph II) and of its drive speed.

Figure 3:
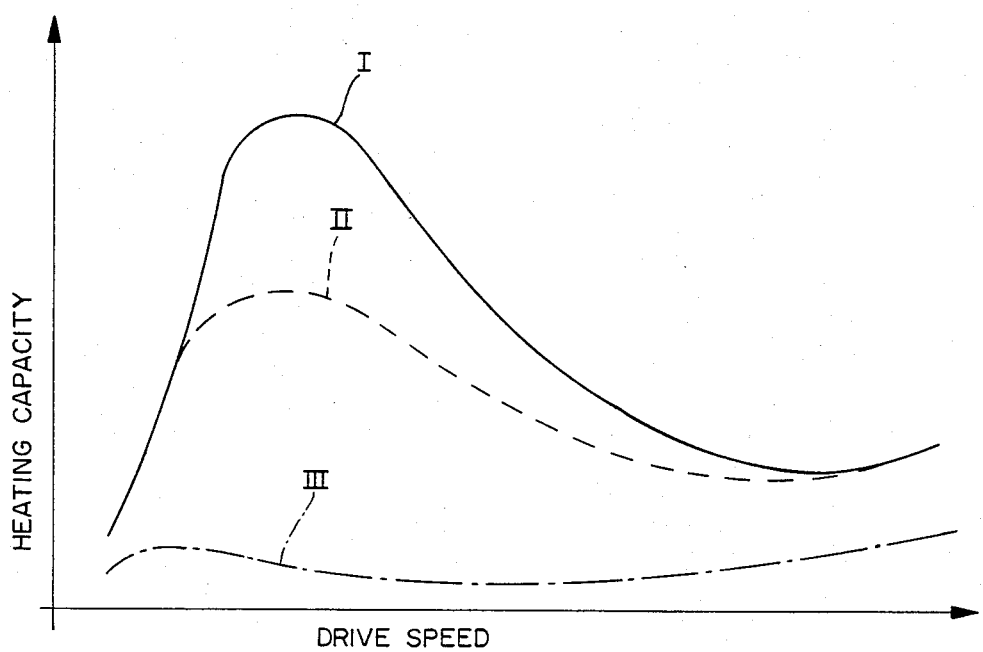
FIG. 3 shows the curve of the heating capacity of the hydrodynamic brake of FIG. 1 as a function of the drive speed.
Figure 4:
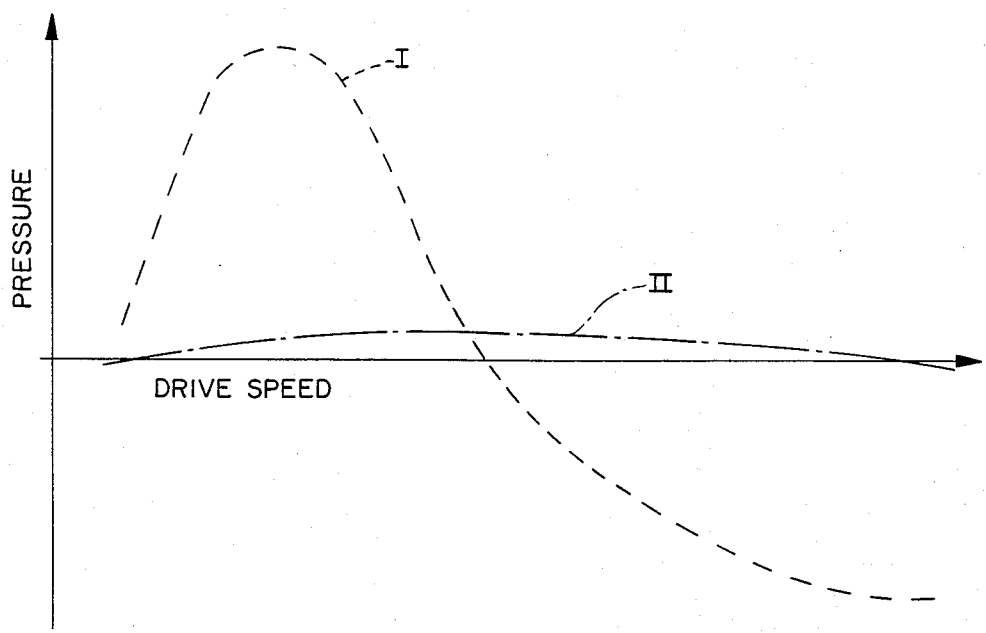
FIG. 4 shows the reference pressure curve which is available from the suction side of the cooling medium circulating pump (graph II) and also the reference pressure curve which is available from the ring duct of the hydrodynamic brake (graph I)

If the accelerator pedal 27 is depressed so far that the internal combustion engine 1 is in the partial load range—accelerator pedal position 27a—then the electrical switch 23 is closed. The 3/2-way valve 29 is moved by its electrical drive into the switch position 2. The system pressure of the cooling medium circuit 11, which exists on the suction side of the cooling medium circulating pump 4, is applied as reference pressure to the control piston of the pressure regulator valve 19 (FIG. 4, graph II). The heating capacity of the hydrodynamic brake is depicted in FIG. 3, graph III.

During full load operation of the internal combustion engine the accelerator pedal 27 occupies the position 27b shown. The electrical switches 22, 23 are closed and the electrically operable 2/2-way valve 28 is moved from the switch position I into the switch position II and closes the pipe 16. The supply of coolant liquid to the hydrodynamic brake 7 is prohibited, whereby the heating capacity of the hydrodynamic brake 7 ceases to be effective.

When the internal combustion engine changes from full load operation to idling or overrunning, the changeover of the 2/2-way valve 28 and of the 3/2-way valve 29 occurs in reverse sequence.

Figure 2:
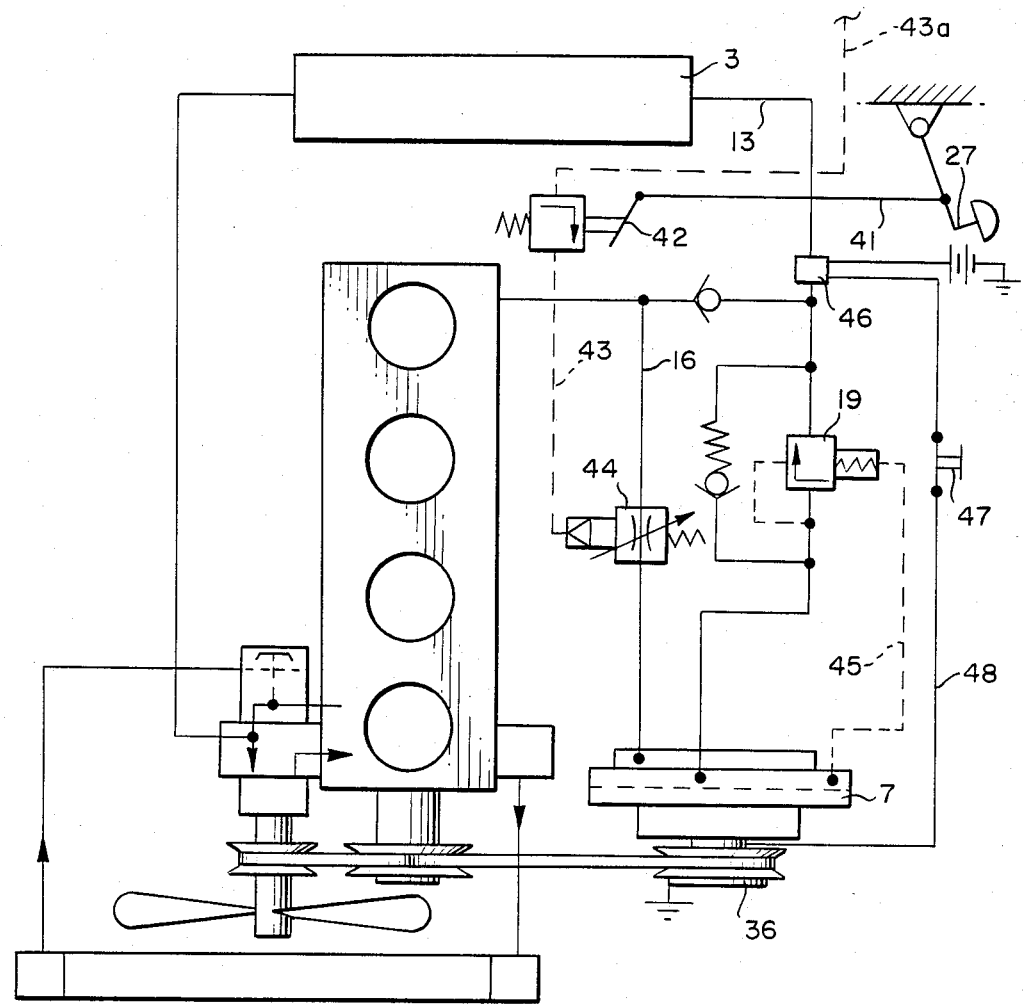
FIG. 2 shows a diagrammatically illustrated cooling medium circuit of an internal combustion engine with an infinite mode of control of the heating capacity of a hydrodynamic brake.

The exemplary embodiment shown in FIG. 2 differs from the exemplary embodiment shown according to FIG. 1 by an accelerator pedal 27 which influences, by a control rod 41, a pressure regulator valve 42 which is arranged in a pipe 43. The pipe 43 connects via 43a a negative-pressure source, not shown in detail, to a pressure-operable variable flow regulator valve 44. The variable flow regulator valve 44 is arranged in the pipe 16.

Figure 5:
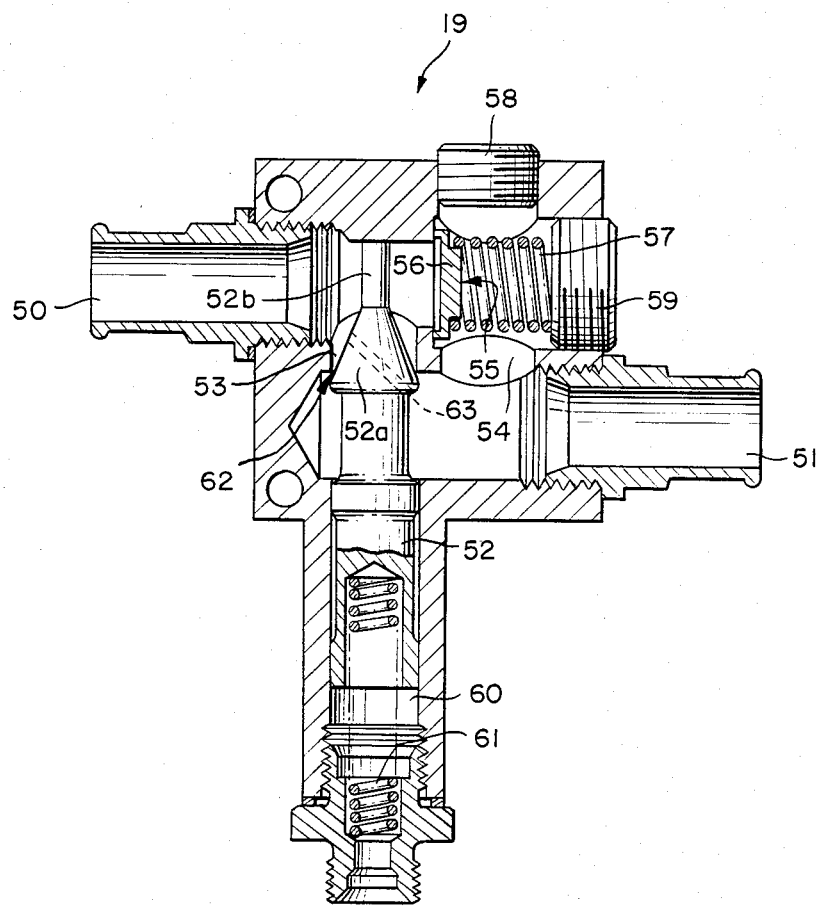
FIG. 5 shows a pressure regulator valve illustrated in longitudinal section.

The control piston of the pressure regulator valve 19 is loaded by the pressure existing in the ring duct of the hydrodynamic brake 7, which pressure is passed through a pipe 45 from the hydrodynamic brake 7 to the pressure regulator valve 19. The pressure regulator valve 19 of FIG. 2 is of identical construction to the pressure regulator valve 19 according to FIG. 1, the construction of which is illustrated in FIG. 5. In contrast to the pressure regulator valve 19 of FIG. 1, the pressure regulator valve 19 of FIG. 2 is modulated exclusively by the reference pressure tapped from the ring duct via pipe 45.

In a further development of the invention, the heating capacity of the hydrodynamic brake 7 may also be controlled without the pressure regulator valve 19. In this case the heating capacity of the hydrodynamic brake 7 is, according to FIG. 3, infinitely adjustable between the maxima of the graph I and the maxima of the graph III, but reduction of heating capacity does not occur with increasing drive speed of the hydrodynamic brake 7. When a predetermined cooling medium temperature of the coolant liquid flowing to the heat exchanger 3 is attained, a thermostat valve 46 in the pipe 13 opens a switch in an electrical conductor 48 which leads to the solenoid coupling 36.

When the internal combustion engine 1 is operated with switch 47 in the closed position with a solenoid coupling in the circuit which closes the drive line to the hydrodynamic brake 7, an automatic control of the heating capacity of the hydrodynamic brake 7 occurs as a function of the pressure in the ring duct of the hydrodynamic brake 7 (FIG. 4, graph I), which is modified by the drive speed of the hydrodynamic brake 7. According to FIG. 3 the heating capacity is continuously automatically adjustable between the graph I and the graph III, namely as a function of the drive speed of the hydrodynamic brake 7.

FIG. 3 shows the curve of a capacity characteristic of a hydrodynamic brake which is used as a heater according to the invention. A graph I shows the curve of heating capacity extending across the range of drive speed of the hydrodynamic brake. A graph II describes the curve of the heating capacity during partial load operation of the internal combustion engine, and the graph III the curve of the heating capacity during full load operation of the internal combustion engine 1 according to the exemplary embodiment shown in FIG. 2.

A graph I shown in FIG. 4 shows the curve of pressure in the ring duct of the hydrodynamic brake 7 as a function of the drive speed of the hydrodynamic brake 7. The pressure curve which exists on the suction side of the cooling medium circulating pump 4 as a function of the drive speed of the internal combustion engine 1 is described by the graph II.

The pressure regulator valve 19 shown in FIG. 5 exhibits an inlet orifice 50 and an outlet orifice 51, the axes of which are arranged mutually axially parallel. Besides a bore 53 closable by a control piston 52 and connecting together the inlet orifice 50 and the outlet orifice 51, a further bore 54 connecting the inlet orifice 50 and the outlet orifice 51 is present. A pressure relief valve 55 comprising a valve plate 56 and a spring 57 closes the inlet orifice 50 to the bore 54. The bore 54 and the inlet orifice 50 are provided with closure screws 58, 59 on the housing side. The control piston 52 is guided in a bore 60 and pressed against a valve seat 62 by the spring 61. The sharp conical valve plate 52a exhibits a guide stud 52b and a bore 63 which bridges the valve seat 62.

The coolant liquid enters the inlet orifice 50 of the pressure regulator valve 19 and loads the valve plate 52a of the control piston 52. If the coolant liquid pressure is lower in pressure than the opening pressure of the control piston, then a control quantity of coolant liquid flows through the bore 63 into the outlet orifice 51 of the pressure regulator valve 19.

In the case of an abrupt or brief excess pressure of coolant liquid which is greater than the opening pressure necessary to operate the control piston 52, the pressure relief valve 55 opens. Coolant liquid flows through the annular space formed between the valve seat and the valve plate 56 into the bore 54 and from there into the outlet orifice 51 of the pressure regulator valve 19.

If the control pressure formed by the reference pressure and by the spring 61, and acting upon the control piston 52, is lower than the coolant liquid pressure, then an annular space is created between the valve seat 62 and the valve plate 52a, through which the coolant liquid flows from the inlet orifice 50 to the outlet orifice 51.

Any coolant liquid escaping between the control piston 52 and the adjacent wall of the bore 60 is positively fed back through the pipes 30, 31, 32, FIG. 1, and 45, FIG. 2, to the liquid circuit of the internal combustion engine. Any leakage of the pressure regulator valve 19 on the reference-pressure side relative to the surroundings of the pressure regulator valve 19 is therefore impossible. In case the ambient air pressure is used as reference pressure, the cooling medium circuit must be sealed with seal elements relative to the surroundings of the pressure regulator valve 19. It is not possible by this means to achieve leakage-free sealing throughout the useful life of the pressure regulator valve.

While we have shown and described several embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A method of controlling the heating capacity of a hydrodynamic brake for a liquid cooled internal combustion engine controlled in response to movement of an acceleration pedal, the engine having a cooling circuit comprising at least one heat exchanger, a cooling medium circulating pump, the hydrodynamic brake serving as a heat exchanger and a pressure regulator valve means actuatable in response to movement of the acceleration pedal for regulating the state of charge of the hydrodynamic brake, the steps comprising
   circulating the cooling medium through the cooling circuit, and
   controlling the heating capacity of the hydrodynamic brake as a function of the load of the internal combustion engine by actuating at least the pressure regulator valve means by movement of the accelerator pedal.

2. A method of controlling the heating capacity of a hydrodynamic brake as set forth in claim 1, further comprising the step of
   loading the pressure regulator valve means with a reference pressure available from a location other than the hydrodynamic brake.

3. A method of controlling the heating capacity of a hydrodynamic brake as set forth in claim 1, wherein the hydrodynamic brake has a ring duct, the method further comprising the step of
   loading the pressure regulator valve means with a reference pressure available from the ring duct of the hydrodynamic brake.

4. A method of controlling the heating capacity of a hydrodynamic brake as set forth in claim 1, the method further comprising the step of
   loading the regulator valve with a reference pressure available from a suction side of the circulating pump during partial load operating conditions of the internal combustion engine.

5. A method of controlling the heating capacity of a hydrodynamic brake as set forth in claim 1, the method further comprising the step of
   inhibiting the supply of cooling medium to the hydrodynamic brake during full load operation conditions of the internal combustion engine.

6. A method of controlling the heating capacity of a hydrodynamic brake as set forth in claim 1, the method further comprising the steps of
   applying a pressure available at a suction side of the circulating pump to control the regulating valve during partial load conditions of said internal combustion engine and inhibiting supply of cooling medium to the hydrodynamic brake during full load operating conditions of the internal combustion engine.

7. A method of controlling the heating capacity of a hydrodynamic brake for a liquid cooled internal combustion engine operably responsive to movement of an accelerator pedal and having a cooling circuit comprising at least one heat exchanger, a cooling medium circulating pump, the hydrodynamic brake serving as a heat exchanger, a pressure regulator valve means for regulating the state of charge of the hydrodynamic brake and a flow regulator valve means responsive to movement of the accelerator pedal, the steps comprising
   circulating cooling medium through the cooling circuit, and
   controlling the heating capacity of the hydrodynamic brake as a function of the load of the internal combustion engine by actuating the flow valve means by movement of the accelerator pedal.

8. A method of controlling the heating capacity of a hydrodynamic brake as set forth in claim 7, the method further comprising the step of
   controlling the heating capacity of the hydrodynamic brake as a function of the load of the internal combustion engine by actuating the pressure regulator valve means.

9. A method of controlling the heating capacity of a hydrodynamic brake as set forth in claim 8, wherein the hydrodynamic brake has at least a ring duct, the method further comprising the step of
   applying a reference pressure from the ring duct of the hydrodynamic brake to the pressure regulator valve means.

10. A method of controlling the heating capacity of a hydrodynamic brake as set forth in claim 7,
the method further comprising the steps of
operating the flow regulator valve means in response to a negative pressure available from a negative pressure source, and
adjusting the flow regulator valve means in response to a position of the accelerator pedal.

11. Apparatus for controlling the heating capacity of a hydrodynamic brake for a liquid cooled internal combustion engine operably responsive to movement of an accelerator pedal, the engine having a cooling circuit comprising at least one heat exchanger, a cooling medium circulating pump, the hydrodynamic brake serving as a heat exchanger and a pressure regulator valve means for regulating the state of charge of the hydrodynamic brake,
means for controlling the heating capacity of the hydrodynamic brake as a function of the load of the internal combustion engine by actuating at least the pressure regulator valve means and
means for controlling the actuation of the pressure regulator valve means in response to movement of the accelerator pedal.

12. Apparatus for controlling the heating capacity of a hydrodynamic brake as set forth in claim 11, further comprising
means for loading the pressure regulator valve means with a reference pressure available from a location other than the hydrodynamic brake.

13. Apparatus for controlling the heating capacity of a hydrodynamic brake as set forth in claim 11, wherein the hydrodynamic brake has a ring duct, further comprising
means for loading the pressure regulator valve means with a reference pressure available from the ring duct of the hydrodynamic brake.

14. Apparatus for controlling the heating capacity of a hydrodynamic brake as set forth in claim 11, further comprising
means for loading the regulator valve with a reference pressure available from a suction side of the circulating pump during partial load operating conditions of the internal combustion engine.

15. Apparatus for controlling the heating capacity of a hydrodynamic brake as set forth in claim 11, further comprising
means for inhibiting the supply of cooling medium to the hydrodynamic brake during full load operating conditions of the internal combustion engine.

16. Apparatus for controlling the heating capacity of a hydrodynamic brake for a liquid cooled internal combustion engine operably responsive to movement of an accelerator pedal and having a cooling circuit comprising at least one heat exchanger, a cooling medium crculating pump, the hydrodynamic brake serving as a heat exchanger, a pressure regulator valve means for regulating the state of charge of the hydrodynamic brake and a flow regulator valve means responsive to movement of the accelerator pedal,
means for circulating cooling medium through the cooling circuit, and
means for controlling the heating capacity of the hydrodynamic brake as a function of the load of the internal combustion engine by actuating the flow valve means by movement of the accelerator pedal.

17. Apparatus for controlling the heating capacity of a hydrodynamic brake as set forth in claim 16, further comprising
means for controlling the heating capacity of the hydrodynamic brake as a function of the load of the internal combustion engine by actuating the pressure regulator valve means.

18. Apparatus for controlling the heating capacity of a hydrodynamic brake as set forth in claim 17, wherein the hydrodynamic brake has at least a ring duct, further comprising
means for applying a reference pressure from the ring duct of the hydrodynamic brake to the pressure regulator valve means.

19. Apparatus for controlling the heating capacity of a hydrodynamic brake as set forth in claim 18, wherein the pressure regulator valve means comprises a valve seat, a load control piston having a sharp conical valve plate for seating against the valve seat, a first bore in the region of the valve plate bridging the valve seat, and means for conjointly loading the control piston with a spring force in addition to the reference pressure.

20. Apparatus for controlling the heating capacity of a hydrodynamic brake as set forth in claim 19, wherein the axes of an inlet orifice and an outlet orifice of the pressure regulator valve means are arranged axially parallel and further comprising
a second bore means closable by the control piston for connecting together the inlet orifice and the outlet orifice,
a third bore means for connecting together the inlet orifice and the outlet orifice which is closable by a pressure relief valve.

21. Apparatus for controlling the heating capacity of a hydrodynamic brake as set forth in claim 16, further comprising
means for operating the flow regulator valve means in response to a negative pressure available from a negative source, and
means for adjusting the flow regulator valve means in response to a position of the accelerator pedal.

22. Apparatus for controlling the heating capacity of a hydrodynamic brake as set forth in claim 21, and further comprising
means for applying a pressure available at a suction side of the circulating pump to control the regulating valve during partial load conditions of said internal combustion engine and
inhibiting supply of cooling medium to the hydrodynamic brake during full load operating conditions of the internal combustion engine.

* * * * *

UNITED STATES PATENT AND TRADEMARK OFFICE
CERTIFICATE OF CORRECTION

PATENT NO.   : 4,538,553

DATED        : September 3, 1985

INVENTOR(S)  : KURZ, et al.

It is certified that error appears in the above-identified patent and that said Letters Patent is hereby corrected as shown below:

Column 8, line 51, the line ending
    "a hydrodynamic brake as set forth in claim 21, and"

should read
    --a hydrodynamic brake as set forth in claim 12, and--.

Signed and Sealed this

Eleventh Day of November, 1986

Attest:

DONALD J. QUIGG

*Attesting Officer*          *Commissioner of Patents and Trademarks*